US012788186B2

(12) United States Patent
Tan et al.

(10) Patent No.: US 12,788,186 B2
(45) Date of Patent: Nov. 10, 2026

(54) FOOD PROCESSING APPARATUS WITH BLADE ARRANGEMENT

(71) Applicant: KONINKLIJKE PHILIPS N.V., Eindhoven (NL)

(72) Inventors: Jingwei Tan, Eindhoven (NL); Declan Patrick Kelly, Eindhoven (NL); Yun Chen, Eindhoven (NL); Paul Bernard Joseph Higgins, Eindhoven (NL)

(73) Assignee: VERSUNI HOLDING B.V., Eindhoven (NL)

( * ) Notice: Subject to any disclaimer, the term of this patent is extended or adjusted under 35 U.S.C. 154(b) by 605 days.

(21) Appl. No.: 18/268,208

(22) PCT Filed: Dec. 14, 2021

(86) PCT No.: PCT/EP2021/085733

§ 371 (c)(1),
(2) Date: Jun. 16, 2023

(87) PCT Pub. No.: WO2022/129078

PCT Pub. Date: Jun. 23, 2022

(65) Prior Publication Data

US 2024/0074616 A1 Mar. 7, 2024

(30) Foreign Application Priority Data

Dec. 18, 2020 (WO) ................ PCT/CN2020/137657
Feb. 8, 2021 (EP) .................................... 21155661

(51) Int. Cl.
*A47J 43/00* (2006.01)
*A47J 43/046* (2006.01)
*A47J 43/07* (2006.01)
*A47J 43/08* (2006.01)
*B01F 27/116* (2022.01)
(Continued)

(52) U.S. Cl.
CPC ....... *A47J 43/0722* (2013.01); *A47J 43/0465* (2013.01); *A47J 43/085* (2013.01);
(Continued)

(58) Field of Classification Search
CPC .... B01F 29/87; A23G 3/0215; A47J 43/0465; A47J 43/085
(Continued)

(56) References Cited

U.S. PATENT DOCUMENTS 3,245,664 A 4/1966 Gatheridge
4,108,054 A 8/1978 Klocker et al.
(Continued)

FOREIGN PATENT DOCUMENTS

CN 105473291 A 4/2016
CN 105520497 A 4/2016
(Continued)

OTHER PUBLICATIONS

Extended European Search Report issued in connection with corresponding EP Application No. 21155661.8 dated Jul. 1, 2021.

*Primary Examiner* — Anshu Bhatia
(74) *Attorney, Agent, or Firm* — Maschoff Brennan

(57) ABSTRACT

Disclosed is a food processing apparatus having a food processing chamber, comprising a blade arrangement and a motor arranged to drive the blade arrangement. The blade arrangement comprises a body having a surface arrangement delimiting a cavity and a plurality of cutting blades extending from the surface arrangement into the cavity.

12 Claims, 12 Drawing Sheets

(51) Int. Cl.

| | |
|---|---|
| ***B01F 29/87*** | (2022.01) |
| ***B01F 35/31*** | (2022.01) |
| ***B01F 35/32*** | (2022.01) |
| *B01F 101/06* | (2022.01) |

(52) U.S. Cl.

CPC ............ *B01F 27/116* (2022.01); *B01F 29/87* (2022.01); *B01F 35/31* (2022.01); *B01F 35/3204* (2022.01); *B01F 2101/06* (2022.01)

(58) Field of Classification Search

USPC ................................................ 366/92, 93, 94

See application file for complete search history.

(56) References Cited

U.S. PATENT DOCUMENTS

| | | | | |
|---|---|---|---|---|
| 5,355,784 | A | 10/1994 | Franklin et al. | |
| 2010/0154658 | A1 | 6/2010 | Conti et al. | |
| 2014/0246531 | A1 | 9/2014 | Mcbean | |
| 2016/0256005 | A1* | 9/2016 | Dickson, Jr. ............ | B01F 27/61 |
| 2017/0184069 | A1 | 6/2017 | Roberts | |

FOREIGN PATENT DOCUMENTS

| | | | | |
|---|---|---|---|---|
| CN | 205233424 | U | 5/2016 | |
| CN | 108601484 | A | 9/2018 | |
| EP | 2740392 | A1 | 6/2014 | |
| EP | 3578089 | A1 | 12/2019 | |
| EP | 3586688 | A1 | 1/2020 | |
| WO | 2010012727 | A1 | 2/2010 | |
| WO | WO-2017136635 | A1 * | 8/2017 | .......... A47J 43/0727 |
| WO | 2018104813 | A1 | 6/2018 | |

* cited by examiner

1

10

10

FOOD PROCESSING APPARATUS WITH BLADE ARRANGEMENT

CROSS-REFERENCE TO RELATED APPLICATIONS

The present application is a U.S. National Phase application under 35 U.S.C. § 371 of International Application No. PCT/EP2021/085733, filed on Dec. 14, 2021, which claims the benefit of European Patent Application No. 21155661.8, filed on Feb. 8, 2021, which claims the benefit of International Application No. PCT/CN2020/137657, filed on Dec. 18, 2020. This application is hereby incorporated by reference herein.

FIELD OF THE INVENTION

The present invention relates to a food processing apparatus having a food processing chamber comprising a blade arrangement and a motor arranged to drive the blade arrangement.

BACKGROUND OF THE INVENTION

Many food processors, e.g. blenders or smoothie makers, operate by the rotation of a blade arrangement in a food processing chamber such as a jug or the like. To this end, the blades typically outwardly extend from a central shaft, which central shaft may be mechanically driven by a motor in a base on which the food processing chamber can be mounted, or may be magnetically driven, such as for example disclosed in WO2018/104813, which discloses a processing device of food products and drinkables using a space-varying magnetic field for blade rotation.

In order to achieve the desired cutting action, e.g. to achieve a substantially homogenous cutting of the ingredients within the food processing chamber, the blade arrangement must be rotated at relatively high speed and with sufficient power to avoid large chunks of food jamming the blade arrangement. This means that the blade arrangement and the motor (and its gear box) typically are quite noisy. For instance, such high speed rotation of the blade arrangement typically introduces unwanted vibrations of the blades, which adds to the noise levels produced by the food processing apparatus. In addition, to prevent such motors from overheating, some form of ventilation to the base in which the motor is housed needs to be provided, e.g. a fan-driven air flow through the base, which further adds to the noise produced by the food processing apparatus. The resulting noise levels produced by such food processing apparatuses are generally perceived as being unpleasant or undesirable by most users.

In addition, the rotating blades generate a centrifugal force in the food medium that is being processed in the food processing chamber, which causes chunks of food to be thrown onto the walls of the food processing chamber, such chunks of food can stick to the walls for a prolonged period of time and be only released therefrom by collision with another chunk of food or by gravity. This can lead to the final processed food product or the food processing chamber still containing chunks of food upon completion of the food processing operation, both of which are undesirable and can lead to a user considering the food processing apparatus to be imperfect or even inadequate. In addition, during operation, the vortex created in the food by the blade rotation tends to take food chunks away from the cutting blades due to the cutting blades extending outwardly, which compromises cutting efficiency and increases cutting blade wear.

SUMMARY OF THE INVENTION

The present invention seeks to provide a food processing apparatus that can produce an improved food processing operation at reduced noise levels.

According to an aspect, there is provided a food processing apparatus having a food processing chamber comprising a blade arrangement and a motor arranged to drive the blade arrangement, wherein the blade arrangement comprises a body having a surface arrangement delimiting a cavity and a plurality of cutting blades extending from said surface arrangement into said cavity.

The provision of such a blade arrangement benefits from the fact that the blades are not attached to a central shaft but are distributed around a body, such that interferential amplification of vibration noise generated by blades attached to a common shaft is suppressed. Moreover, due to the blades extending inwardly into the cavity within the body of the blade arrangement, a more efficient cutting action is achieved in which the inward direction of the blades causes food to be pushed towards the centre of the food processing chamber rather than to its one or more walls as is the case with outwardly pointing blades, thereby avoiding the risk of chunks of food being thrown towards such walls. The more efficient cutting action further allows for the food processing apparatus to be operated at lower rotation speeds if so desired because by moving the blade arrangement more towards the periphery of the food processing chamber, a higher torque is generated with the blade arrangement such that a required torque can be achieved at lower rotation speeds. This further aids reduction of the noise levels produced by the food processing apparatus. In addition, because the blade arrangement is arranged around the rim of the food processing chamber, the food processing chamber may be widened without compromising cutting efficiency, thus allowing larger chunks of food to be processed.

In a particular embodiment, the body is a cylindrical body, which for instance is preferable for ease of operation and cleaning purposes. However, in alternative embodiments, the surface arrangement may be multi-faceted, e.g. have a polygonal cross-section.

In an embodiment, the cutting blades are offset to each other along a central axis of the body. This increases the cutting volume of the blade arrangement, thereby further improving its cutting efficiency, whilst the distribution of the blades over the inner surface of the body such that the blades lie in different horizontal planes when the central axis of the cylindrical body is an a vertical orientation furthermore provides a particularly quiet blade arrangement.

The body preferably is arranged proximal to the rim of the food processing chamber. For instance, the body may form an integral part of the food processing chamber or may be secured against a bottom portion of the food processing chamber. To this end, the food processing apparatus may further comprise a securing ring arranged to secure the blade arrangement on a bottom portion of the food processing chamber, which securing ring for instance may be screwed onto the bottom portion of the food processing chamber.

In a particular set of embodiments, the motor is mechanically coupled to food processing chamber such as to rotate the food processing chamber including the blade arrangement, e.g. to increase movement of ingredients within the food processing chamber using gravitational and centrifugal forces. Such a driving mechanism may be used when the blade arrangement is integral to the food processing chamber as well as when the blade arrangement is detachable from the food processing chamber, e.g. when the blade arrangement is secured against the food processing chamber with the securing ring. In this set of embodiments, the motor may be mechanically coupled to the food processing chamber in any suitable manner, e.g. to the blade arrangement through an aperture in the bottom portion of the food processing chamber, to the sealing ring if present or directly to the food processing chamber, e.g. in case of a food processing chamber that is closed at the bottom such that the motor may interface with a bottom portion of the food processing chamber.

In this set of embodiments, the food processing apparatus may further comprise a protective cover at least partially covering the food processing chamber to prevent a user from being able to touch or otherwise access the rotating food processing chamber, which for instance may assist in preventing the user from accidental injury.

Where the blade arrangement is rotated together with the food processing chamber, the blade arrangement itself may not be rotatable. However, where the blade arrangement is to be rotated independent of the food processing chamber, or the food processing chamber is to be rotated independent of the blade arrangement, the blade arrangement may further comprise a further body, and the body may be rotatably mounted on said further body, in which case the body typically comprises a cylindrical outer surface to facilitate such rotation. To this end, the motor may be mechanically coupled to the body such as to rotate the body within the food processing chamber. Alternatively, the motor may be mechanically coupled to the food processing chamber such as to rotate the food processing chamber (and the further body) around the stationary body.

The mechanical coupling in any of these embodiments may comprise a central shaft driven by the motor and at least one engagement member coupled to the central shaft arranged to engage with the securing ring or the body. Such a drive mechanism may simply comprise a central shaft or alternatively the at least one engagement member may be mounted on a further cylindrical body attached to said central shaft or may comprise a plurality of engagement members individually mounted on respective arms that extend from said central shaft in a radial arrangement.

In the above embodiments, the blade arrangement is mechanically driven by the motor. However, in an alternative set of embodiments, the blade arrangement may be magnetically driven. To this end, the motor may comprise a stator arranged to create a rotating magnetic field, wherein the body is responsive to said rotating magnetic field. For instance, the body may be made of a paramagnetic material, e.g. a paramagnetic metal such as iron or the like, and comprise an arrangement of magnets or poles arranged around the body to make the body responsive to the rotating magnetic field having a direction of rotation perpendicular to the central axis of the body such as to induce rotation of the body around its central axis. The stator preferably is arranged around the body to optimize the coupling between the induced rotating magnetic field and the body.

In a particular embodiment, the food processing apparatus further comprises a docking station for the food processing chamber, said docking station including a base including the motor for engaging with a bottom portion of the food processing chamber including the blade arrangement, and a holder opposing the base for engaging with a top portion of the food processing chamber. Docking the food processing chamber in such a docking station further reduces operation noise of the food processing apparatus. Preferably, the food processing chamber is in a tilted orientation when docked in said docking station such that an orientation of the central axis of the body lies in between a vertical plane and a horizontal plane. This creates a tumbling effect of the food chunks within the food processing chamber, which aids cutting efficiency and reduces load force exerted on the cutting blades by food chunks.

The tilted orientation may be adjustable during operation of the food processing apparatus such that the tilt angle of the food processing chamber may be optimized as a function of progress of the food processing operation, e.g. to change the direction in which the ingredients move and alter movement speed of the ingredients such as to reduce the potential accumulation of ingredients in a particular location and consequently improve cutting efficiency.

The food processing apparatus may take any suitable shape. In particular embodiments, the food processing apparatus is a blender or a smoothie maker but other types of food processing apparatuses that implement a cutting function with blades, e.g. grinders, choppers or the like, may also be contemplated.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
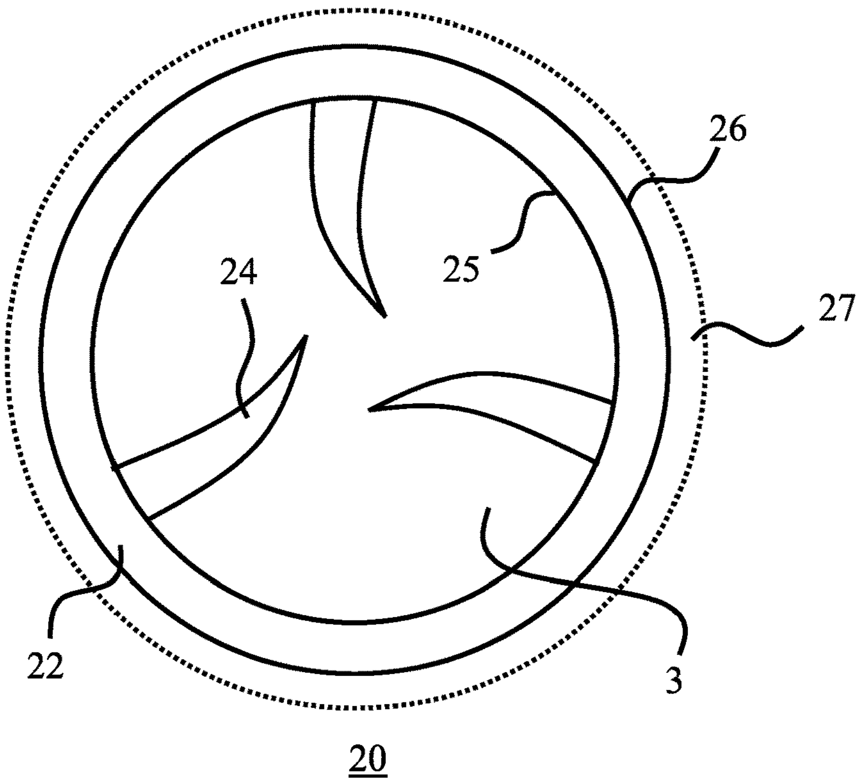
FIG. 1 schematically depicts a top view of a blade arrangement according to an example embodiment.

It should be understood that the Figures are merely schematic and are not drawn to scale. It should also be understood that the same reference numerals are used throughout the Figures to indicate the same or similar parts.

FIG. 1 schematically depicts a top view of a blade arrangement 20 according to an example embodiment. The blade arrangement 20 comprises a body 22 from which a plurality of cutting blades 24 extend inwardly from a surface arrangement 25 of the body 22 into an internal space or cavity 3 delimited by the surface arrangement 25 towards the center of the body 22. The body 22 and the cutting blades 24 may be made of any suitable material, e.g. stainless steel, a suitable plastic and so on. The body 22 may be made of the same material as the cutting blades 24 or may be made of a different material to the cutting blades 24. The cutting blades 24 may have any suitable shape. For example, the cutting blades 24 may be predominantly planar or may have a curved or angled shape instead. The shape of the cutting blades 24 may be optimized depending on their orientation within a food processing chamber of a food processing apparatus. In some examples, cutting blades 24 may be mounted on the surface arrangement 25 of the body 22 in an adjustable manner, such that the configuration of the cutting blades 24 may be adjusted, e.g. to optimize the configuration for a particular food processing task or as a function of a chosen orientation of the food processing chamber comprising the blade arrangement 20.

The mounting of the cutting blades 24 in this manner means that each cutting blade 24 is individually mounted on a separate part of the surface arrangement 25 of the body 22 rather than having a blade arrangement in which outwardly directed cutting blades share a central shaft as is the case in prior art arrangements. This has the advantage that vibrations experienced by individual cutting blades 24 are transferred to other cutting blades 24 of the blade arrangement 20 to a far lesser degree than is the case with cutting blades sharing a central shaft. Consequently, there is less positive interference between the vibrations of individual cutting blades 24. In addition, as each cutting blade 24 is individually mounted, this mounting mechanism can be made more robust or rigid compared to cutting blades sharing a central shaft, which further reduces the vibration of the cutting blades 24 during operation. Consequently, the blade arrangement 20 can be operated more quietly than blade arrangements having cutting blades sharing a central shaft.

The particular configuration of the cutting blades 24 on the surface arrangement 25 of the body 22 further improves the cutting efficiency of the blade arrangement 20. Because of this configuration, the cutting action of the cutting blades 24 is inwardly directed, thus forcing food towards the center of the body 22, i.e. into the cavity 3, rather than to the periphery of a food processing chamber as is the case with cutting blades extending from a central shaft. This is further enhanced by the rotating cutting blades 24 creating a vortex that sucks the food into the center of the body 22 rather than pushing it towards the periphery of the food processing chamber. Moreover, because the loading force exerted by the food interacting with the cutting blades 24 is distributed across the surface arrangement 25 of the body 22, this further enhances cutting efficiency and reduces noise.

Figure 2:
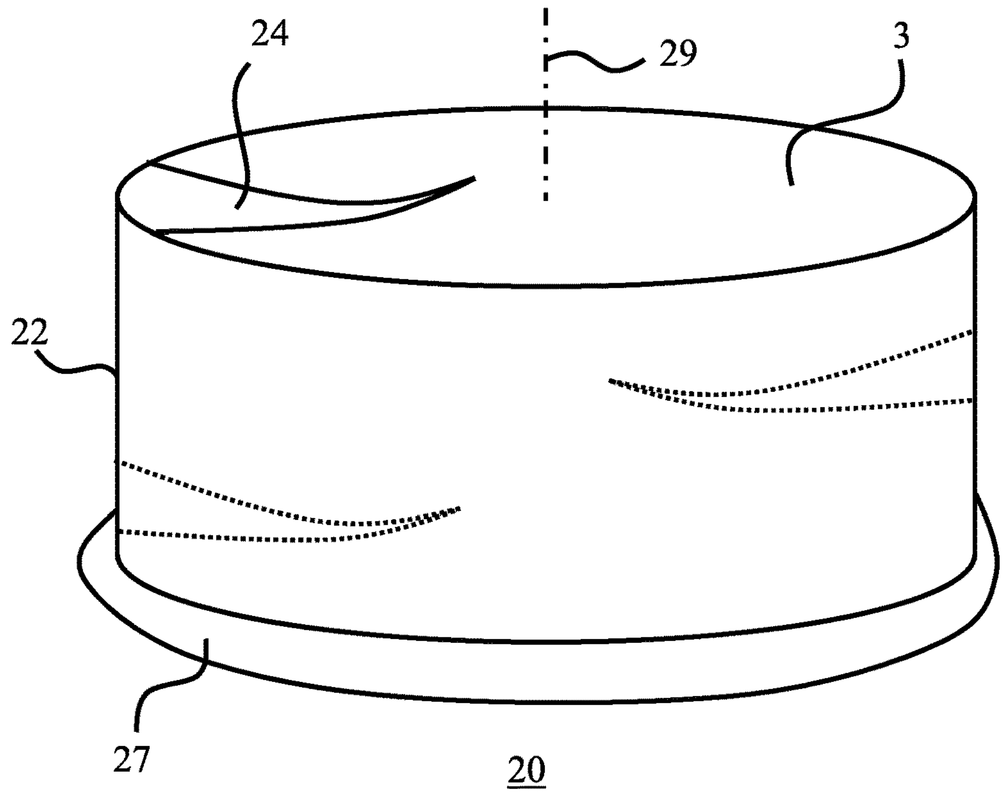
FIG. 2 schematically depicts a perspective view of a blade arrangement according to an example embodiment.

In a particular embodiment, which is schematically depicted in FIG. 2, the respective cutting blades 24 are offset relative to each other along the central axis 29 of the body 22 such as to distribute the cutting blades 24 as much as possible across the surface arrangement 25 of the body 22 such that a cutting action occurs throughout the entire volume of the body 22 in order to optimize the efficiency of the cutting action of the cutting blades 24. The enhanced cutting efficiency of the blade arrangement 20 means that a food processing apparatus deploying the blade arrangement 20 may achieve the same food processing results as a food processing apparatus deploying a blade arrangement having cutting blades outwardly extending from a central shaft whilst operating at lower blade rotation speeds and therefore producing less noise than such a prior art food processing apparatus.

Figure 3:
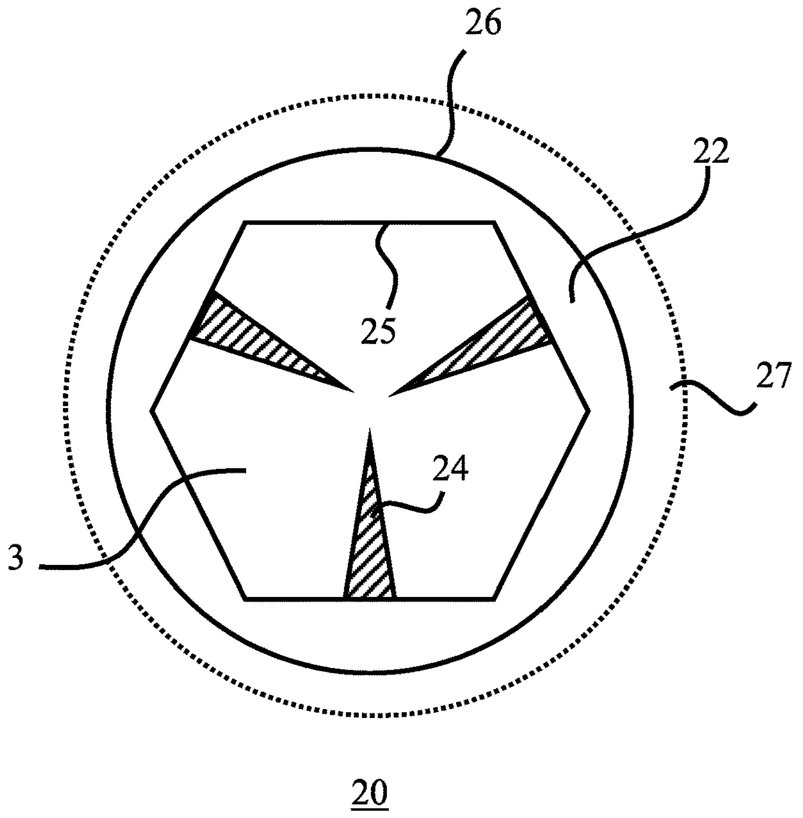
FIG. 3 schematically depicts a top view of a blade arrangement according to another example embodiment.
Figure 4:
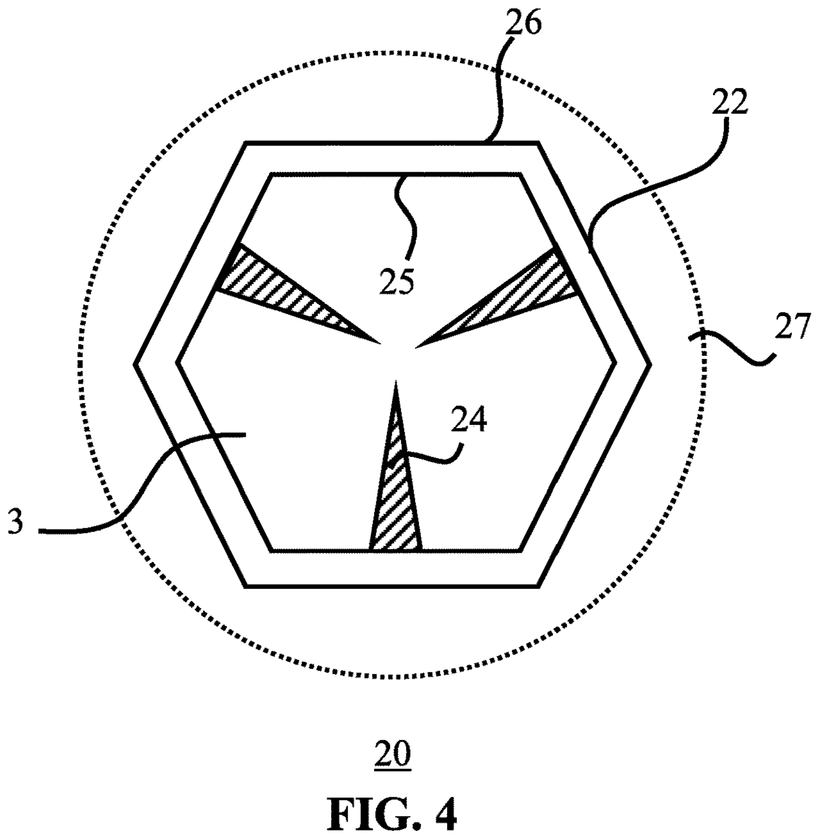
FIG. 4 schematically depicts a top view of a blade arrangement according to yet another example embodiment.

In FIGS. 1 and 2, the body 22 is a cylindrical body in which the surface arrangement 25 forms the inner surface of the cylindrical body and the further surface arrangement 26 forms the outer surface of the cylindrical body. In other words, the surface arrangement 25 and the further surface arrangement 26 each form a single (cylindrical) surface. However, other embodiments of the body 22 are also feasible. For example, as shown in FIG. 3, the body 22 may have a multi-faceted surface arrangement 25, e.g. a surface arrangement 25 having a polygonal cross-section, from which the cutting blades 24 extend into the inner space or cavity 3 delimited by the surface arrangement 25. In this embodiment, the further surface arrangement 26 may still have a circular cross-section, i.e. be shaped as the outer surface of a cylinder, e.g. to facilitate rotation of the body 22 in a further body as will be explained in further detail below. However, as shown in FIG. 4, the further surface arrangement 26 equally may be multi-faceted, e.g. have a polygonal cross-section, which for instance may be the case when the blade arrangement 20 is rotated together with the food processing chamber in which the blade arrangement 20 is mounted, as will be explained in more detail below.

Figure 5:
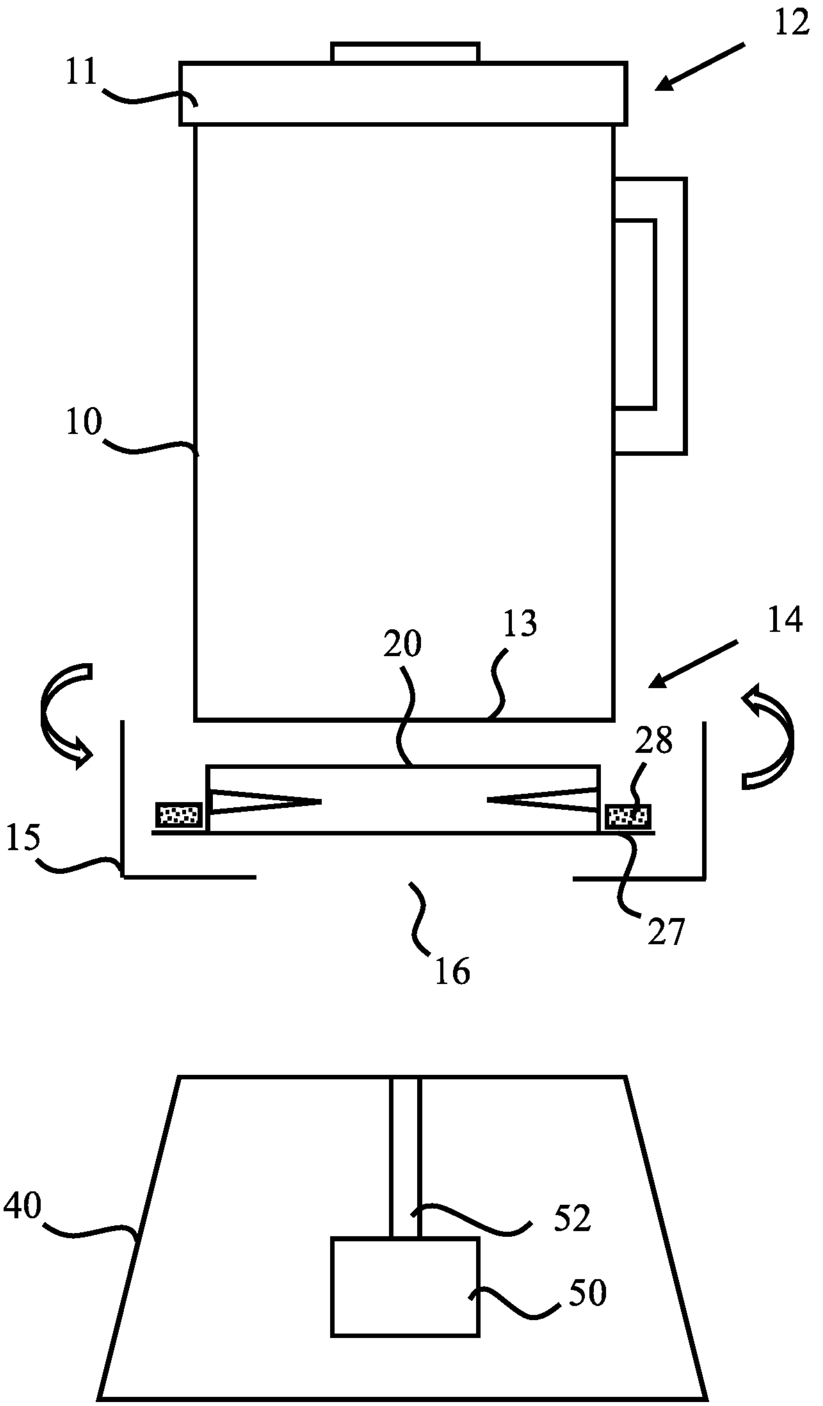
FIG. 5 schematically depicts a cross-sectional exploded view of a food processing apparatus according to an embodiment.

The blade arrangement 20 may be mounted in a food processing chamber 10 of a food processing apparatus 1 in any suitable manner. For example, as schematically depicted in FIG. 5, the food processing chamber 10 of the food processing apparatus 1 may have an upper portion 12 delimiting an access into the food processing chamber 10, which may be sealed with a lid 11 or the like. The blade arrangement 20 may be inserted into the food processing chamber 10, e.g. a cup, jar, bowl or the like, through a central aperture 13 delimited by a bottom portion 14 of the food processing chamber 10 and clamped between the bottom portion 14 and a securing ring 15, which may be screwed onto the bottom portion 14. To this end, both an inner surface of the securing ring 15 and the outer surface of the bottom portion 14 may be threaded, which threads engage with each other when the securing ring 15 is screwed onto the bottom portion 14 of the food processing chamber 10 as indicated by the curved block arrows. A seal 28, e.g. a sealing ring or the like, may be clamped in between the blade arrangement 20 and the bottom portion of the food processing chamber 10 to prevent leakage from the food processing chamber 10 when a liquid is present in the food processing chamber 10. The seal 28 may be secured between the bottom portion 14 of the food processing chamber 10 and the blade arrangement 20 in any suitable manner. For example, the blade arrangement 20 may comprise a flange 27 around the body 22 for supporting the seal 28, such that upon mounting the blade arrangement 20 against the bottom portion 14 of the food processing chamber 10, the seal 28 is trapped between an edge of the bottom portion 14 and the flange 27. Of course, it should be readily understood that the blade arrangement 20 may be sealed against the food processing chamber 10 in any suitable manner. Alternatively, the blade arrangement 20 may be mounted on a drive shaft of the motor of the food processing apparatus in some embodiments.

The food processing chamber 10 typically is mounted on a base 40 housing the motor 50 of the food processing apparatus 1, together with any suitable cooling arrangement (not shown) for the motor 50 if required, e.g. a fan, a water cooling mechanism, a semi-conductive cooling mechanism or the like. Any suitable mounting mechanism may be used for this purpose. As such mounting mechanisms are well-known per se, they will not be discussed in further detail for the sake of brevity. A central shaft 52 typically extends from the motor 50 for driving the blade arrangement 20 as will be explained in more detail below.

Figure 6:
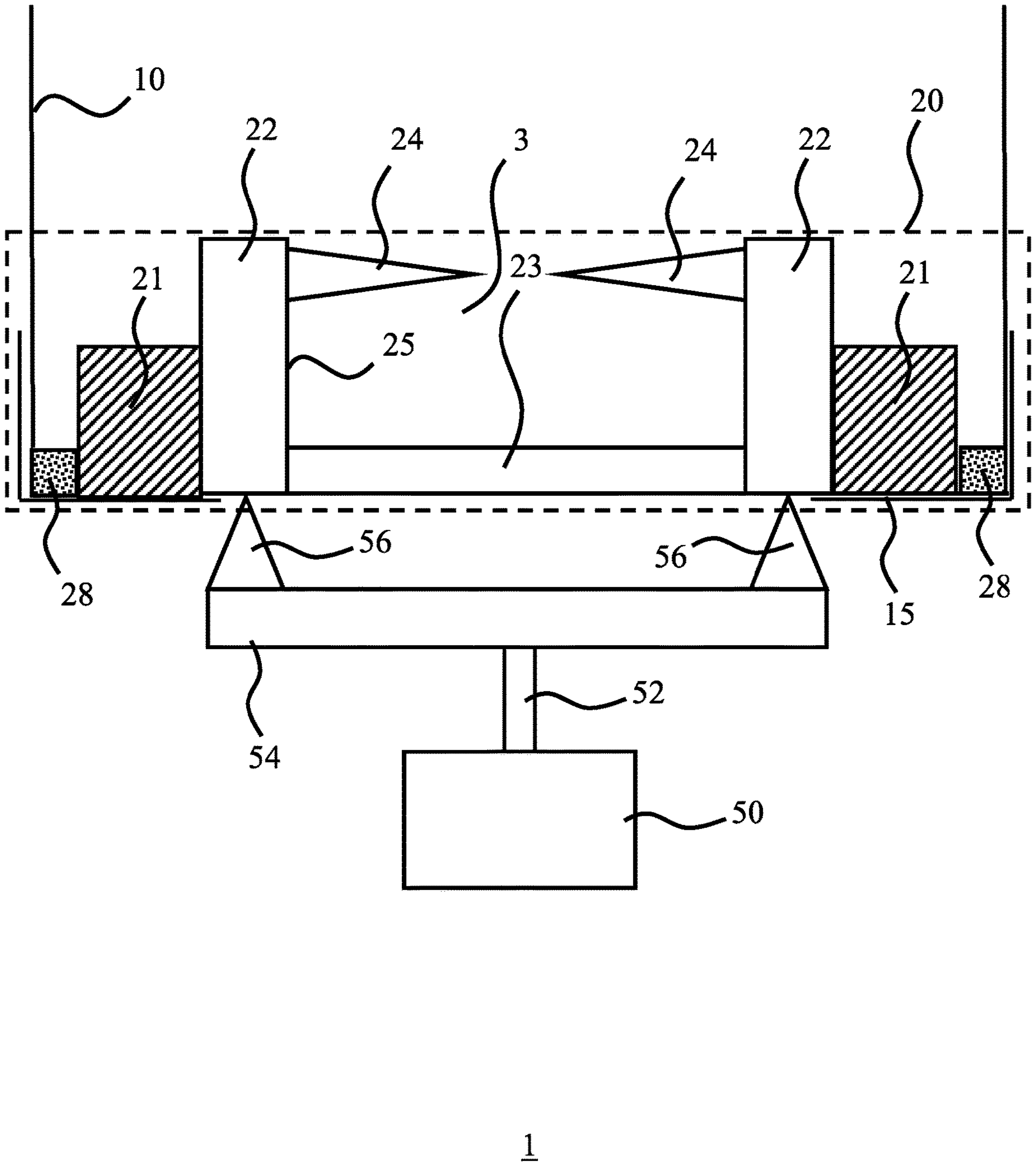
FIG. 6 schematically depicts a cross-sectional view of a detail of a food processing apparatus according to a first set of embodiments.

In a first set of embodiments, the body 22 of the blade arrangement 20 is arranged to rotate within a stationary food processing chamber 10, or alternatively to allow for rotation of the food processing chamber 10 around a static body 22. An example embodiment of such a blade arrangement 20 is schematically depicted in FIG. 6, in which the blade arrangement 20 is mounted against the bottom portion 14 of the food processing chamber 10 as previously described. In this example embodiment, the blade arrangement 20 comprises a static body 21 into which the body 22 is rotationally mounted, e.g. using bearings or the like. In this embodiment, the further surface arrangement 26 typically is cylindrical, although the surface arrangement 25 may take any suitable shape, e.g. a cylindrical shape or a multi-faceted shape as previously explained. The blade arrangement 20 may further comprise a bottom plate 23 from which the body 22 extends such that the cutting blades 24 extend inwardly over the bottom plate 23. The bottom plate 23 seals the bottom of the blade arrangement 20 and may rotate together with the body 22 when being driven by the motor 50. Alternatively, the bottom plate 23 may be a further static body such that the body 22 is rotationally mounted between an inner static body 23 and an outer static body 21, in which case the surface arrangement 25 typically is also cylindrical in shape. Other suitable arrangement for rotationally mounting the body 22 in the blade arrangement 20 may of course be contemplated.

Figure 7:
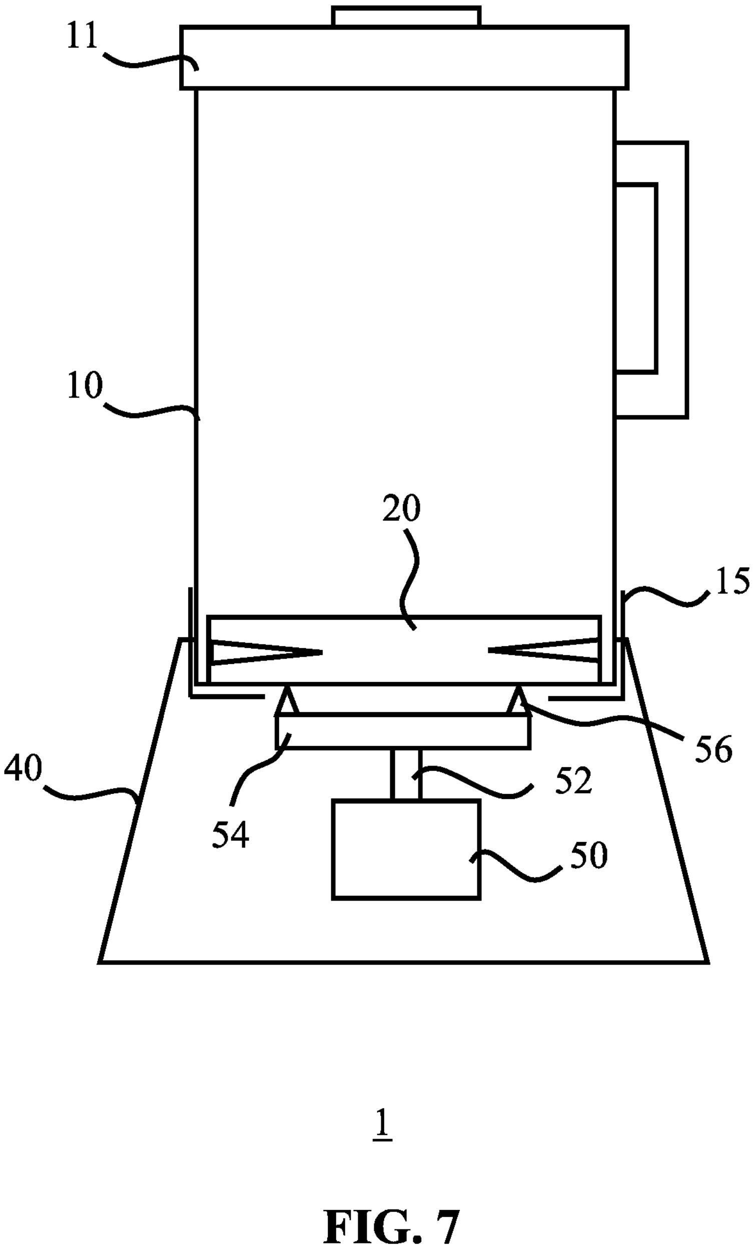
FIG. 7 schematically depicts a cross-sectional view of a food processing apparatus according to an embodiment.

FIG. 6 and FIG. 7 further schematically depict an example drive mechanism of the blade arrangement 20 in which the motor 50 engages with the body 22, e.g. a cylindrical body, through a further cylindrical body 54 on the central shaft 52, with a plurality of engagement members 56, e.g. teeth, ribs or the like, extending from an upper edge of the further cylindrical body 54 for engagement with further engagement members (not shown) on the bottom of the body 22, e.g. slots, grooves or the like. This implementation for instance may be used to rotate the body within a stationary food processing chamber 10 or in which the blade arrangement 20 and the food processing chamber 10 are rotated in unison, i.e. together as a single unit, as will be explained in further detail below.

Figure 8:
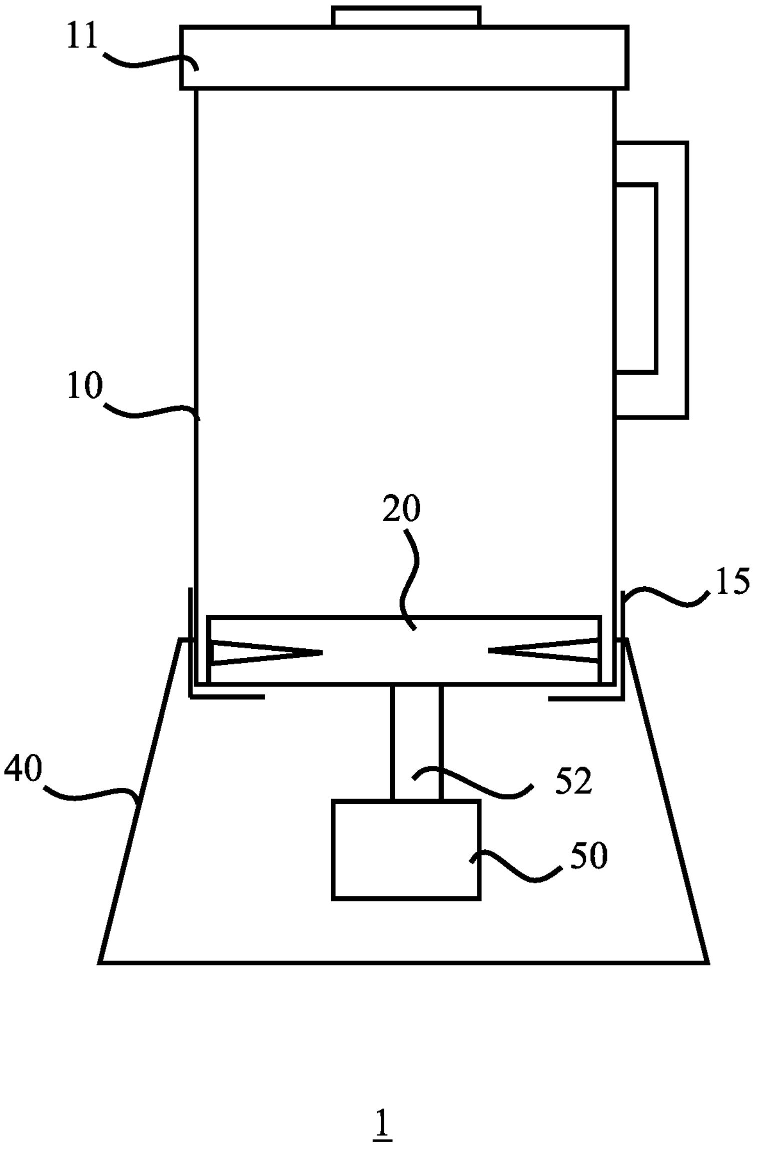
FIG. 8 schematically depicts a cross-sectional view of a food processing apparatus according to another embodiment.
Figure 9:
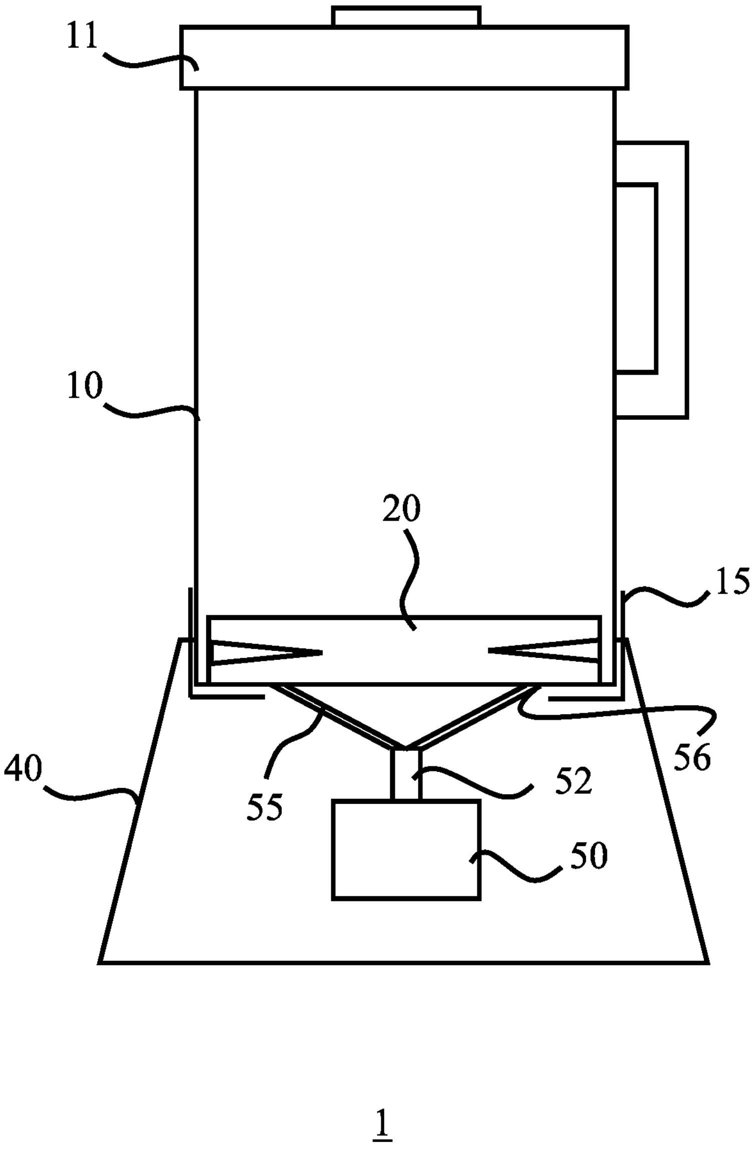
FIG. 9 schematically depicts a cross-sectional view of a food processing apparatus according to yet another embodiment.

The engagement of the drive mechanism between the motor 50 and the cylindrical body 22 may take any suitable shape or form, as will be readily understood by the skilled person. For example, as schematically depicted in FIG. 8, the drive shaft 52 may extend between the motor 50 and the blade arrangement 20, in which case the drive shaft 52 may directly engage with a recipient structure on the bottom plate 23 of the blade arrangement 20. This for example is a suitable implementation where the bottom plate 23 rotates with the body 22 in a static body 21 as previously explained or where the blade arrangement 20 and the food processing chamber 10 are rotated in unison. In yet another example embodiment, which is schematically depicted in FIG. 9, a plurality of arms 55 may radially extend from the central shaft 52 of the motor 50, with each arm 55 terminating in an engagement member 56 for engaging with a further engagement member at the bottom of the body 22 as previously explained. This implementation for instance may be used to rotate the body within a stationary food processing chamber 10 or together with the food processing chamber 10.

Figure 10:
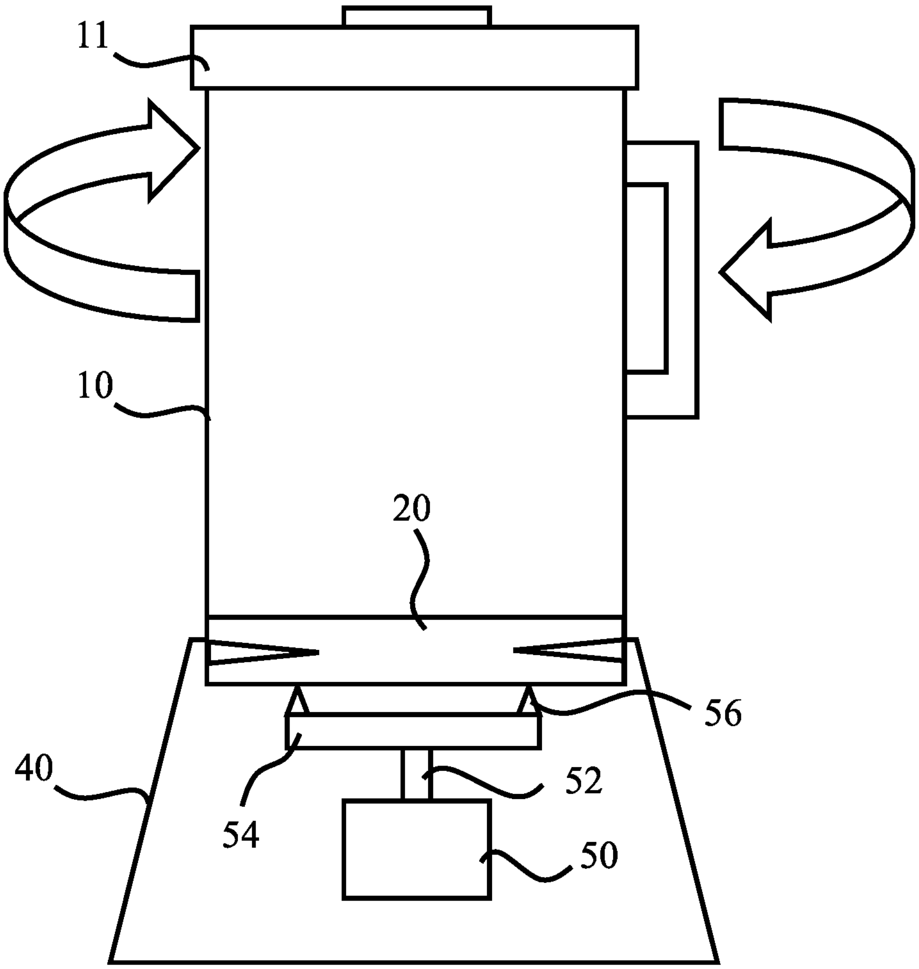
FIG. 10 schematically depicts a cross-sectional view of a food processing apparatus according to a further set of embodiments.

In another set of embodiments, an example embodiment of which is schematically depicted in FIG. 10, the blade arrangement 20 and the food processing chamber 10 are arranged to rotate as a unit, as indicated by the curved block arrows, or the food processing chamber 10 is rotated around a stationary body 22. In this embodiment, the coupling mechanism coupling the motor to the food processing chamber 10 may interact with the blade arrangement 20 of the food processing chamber 10 in any suitable manner for example as depicted in FIG. 7-9 and described in their detailed description, with the difference that the body 22 is not rotationally mounted in the blade arrangement 20, but instead the body 22 is also static such that rotation of the body 22 by the motor 50 is translated to the food processing chamber 10 by virtue of the blade arrangement 20 being mechanically coupled to the food processing chamber 10. Alternatively, the coupling mechanism coupling the motor 50 to the food processing chamber 10 may interact with the securing ring 15 instead, or directly with the bottom portion 14 of the food processing chamber 10, for example in case of a food processing chamber 10 without an aperture 13, in which the bottom portion 14 of the food processing chamber 10 is closed. In the latter embodiment, the inner surface of the bottom portion 14 of the food processing chamber 10 may have some mounting mechanism, e.g. a screw fit or bayonet fit, into which the blade arrangement 20 may be mounted, or the blade arrangement 20 may form an integral part of the food processing chamber 10, e.g. define the bottom portion 14 of the food processing chamber 10. It is also feasible to have a mechanism in which the body 22 of the blade arrangement 20 is locked in a fixed orientation whilst the food processing chamber 10 is rotated by the motor 50. In this embodiment, the body 22 typically is rotationally mounted in the further body 21 such that the further body 21 is rotated together with the food processing chamber 10 whilst the body 22 is kept stationary. Optionally, the body 22 may be locked against the base 40 to ensure that the body 22 is kept stationary during rotation of the food processing chamber 10.

Figure 11:
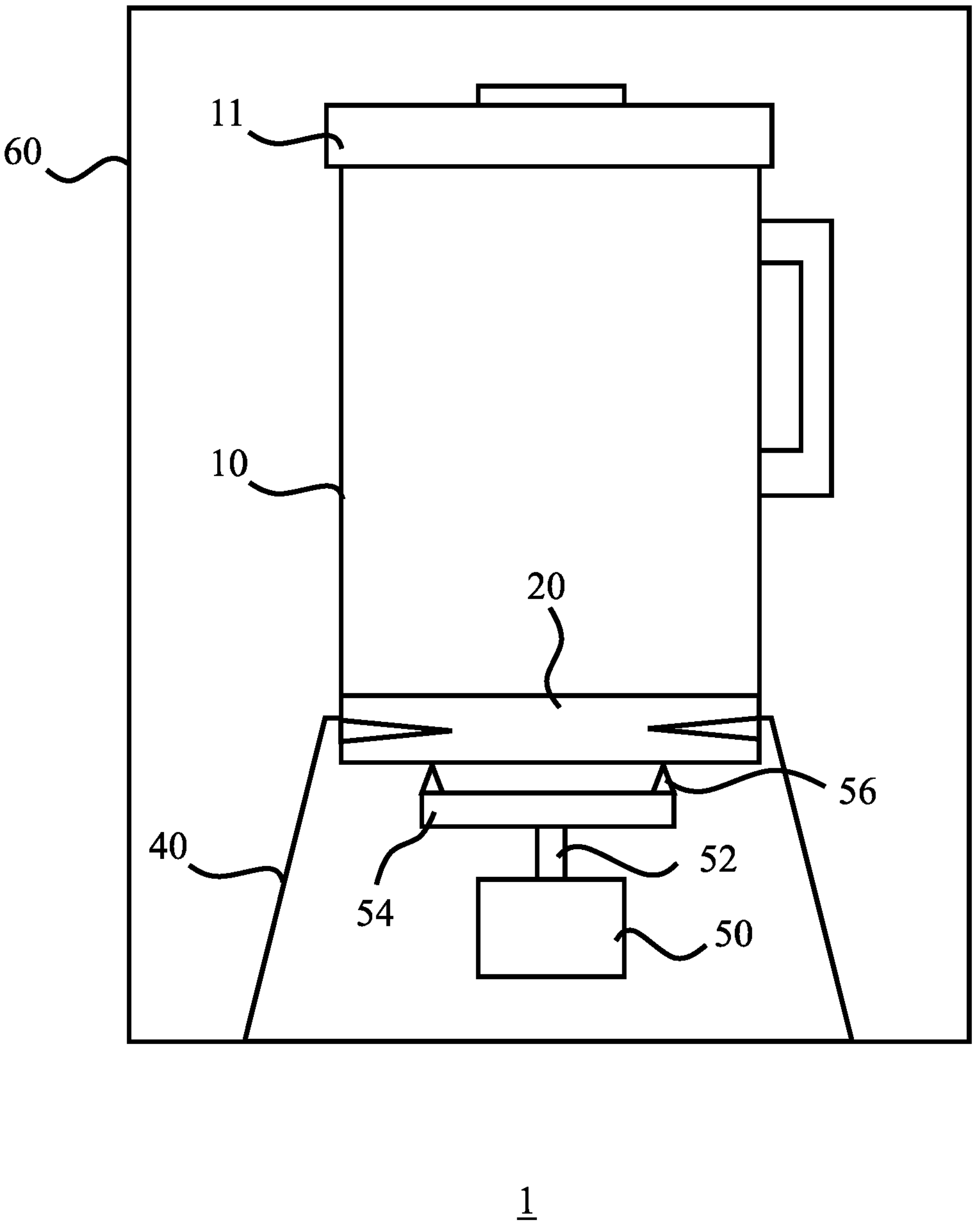
FIG. 11 schematically depicts a cross-sectional view of a food processing apparatus according to yet another embodiment.

In order to protect a user from touching the rotating food processing chamber 10 during operation of the food processing apparatus 1, the food processing apparatus 1 may further comprise a protective cover or housing 60 as schematically depicted in FIG. 11, which at least partially envelops the food processing chamber 10. The protective cover 60 may be made of any suitable material, e.g. glass, metal or plastic. In FIG. 11, the protective cover 60 also envelops the base 40, but it should be understood that this is by way of non-limiting example only as it is equally feasible for the protective cover 60 to extend from the base 40 for example. Any suitable arrangement of the protective cover 60 may be contemplated.

Figure 12:
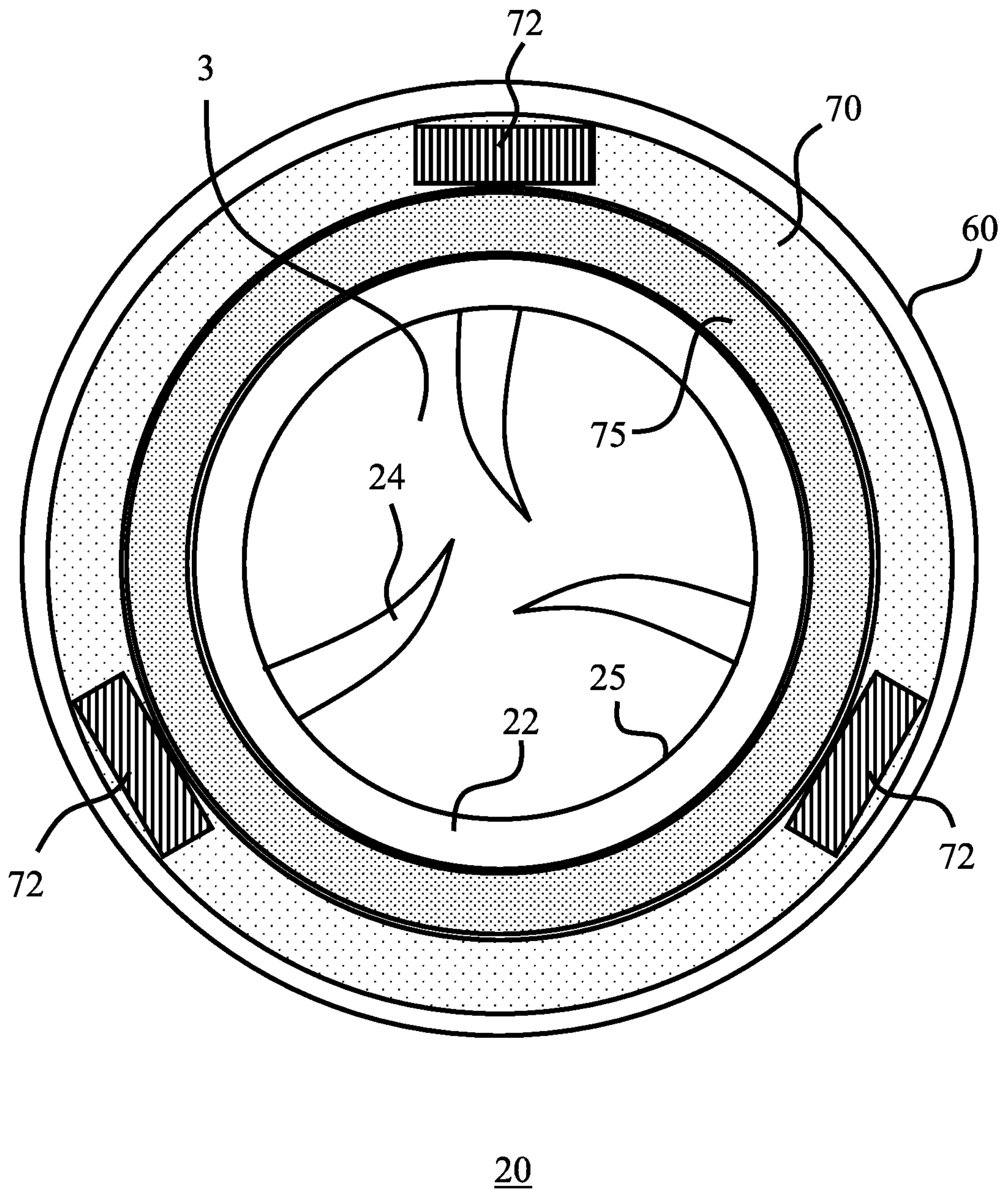
FIG. 12 schematically depicts a cross-sectional view of a detail of a food processing apparatus according to another set of embodiments.

In the foregoing embodiments, the motor 50 is arranged to mechanically invoke rotation of the blade arrangement 20, either within the food processing chamber 10 or with the food processing chamber 10. FIG. 12 schematically depicts a cross-sectional view across the food processing apparatus 1 according to an alternative embodiment in which the motor 50 is arranged to magnetically invoke rotation of the blade arrangement 20, either within the food processing chamber 10 or with the food processing chamber 10. This has the advantage of further noise reduction due to fewer mechanically moving parts in the design of the food processing apparatus 1. To this end, the motor 70 may comprise a stator 70 arranged to generate a rotating magnetic field in any suitable manner. For example, the stator 70 may comprise a number of polar wound coils 72, e.g. two or three of such coils equidistantly spaced around the blade arrangement 20, which coils 72 may generate the rotating magnetic field by driving each of the coils 72 with a sine-wave alternating current with an appropriate phase difference between the currents driving the respective coils 72, e.g. a 90° phase difference in case of two coils 72 and a 120° phase difference in case of three coils 72.

Figure 13:
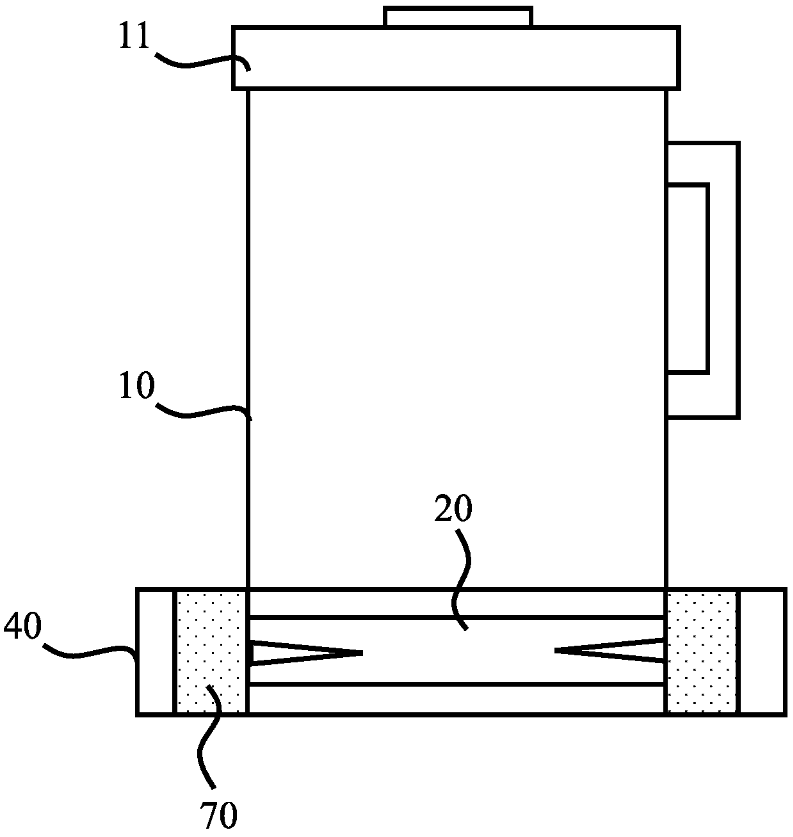
FIG. 13 schematically depicts another cross-sectional view of a detail of a food processing apparatus according to another set of embodiments.

In this embodiment, the body 22, is made of a magnetizable material, e.g. a metal such as iron or the like, with a magnet arrangement 75 distributed on the further surface arrangement 26 of the body 22 such that the rotating magnetic field created by the stator 70 can induce rotation of the blade arrangement 20 by magnetizing the magnetizable material and causing the magnet arrangement 75 to follow the rotating magnetic field, as is well-known per se. The optional protective cover 60 may be placed around the stator 70, e.g. in case the food processing chamber 10 is arranged to rotate together with the blade arrangement 20 as explained in more detail above. As shown in FIG. 13, the stator 70 preferably is arranged in the base 40 such that it surrounds the bottom portion 14 of the food processing chamber 10 including the blade arrangement 20. Not only does this optimize the magnetic coupling between the stator 70 and the blade arrangement 20, but it furthermore can provide a particular compact design of the food processing apparatus 1.

Figure 14:
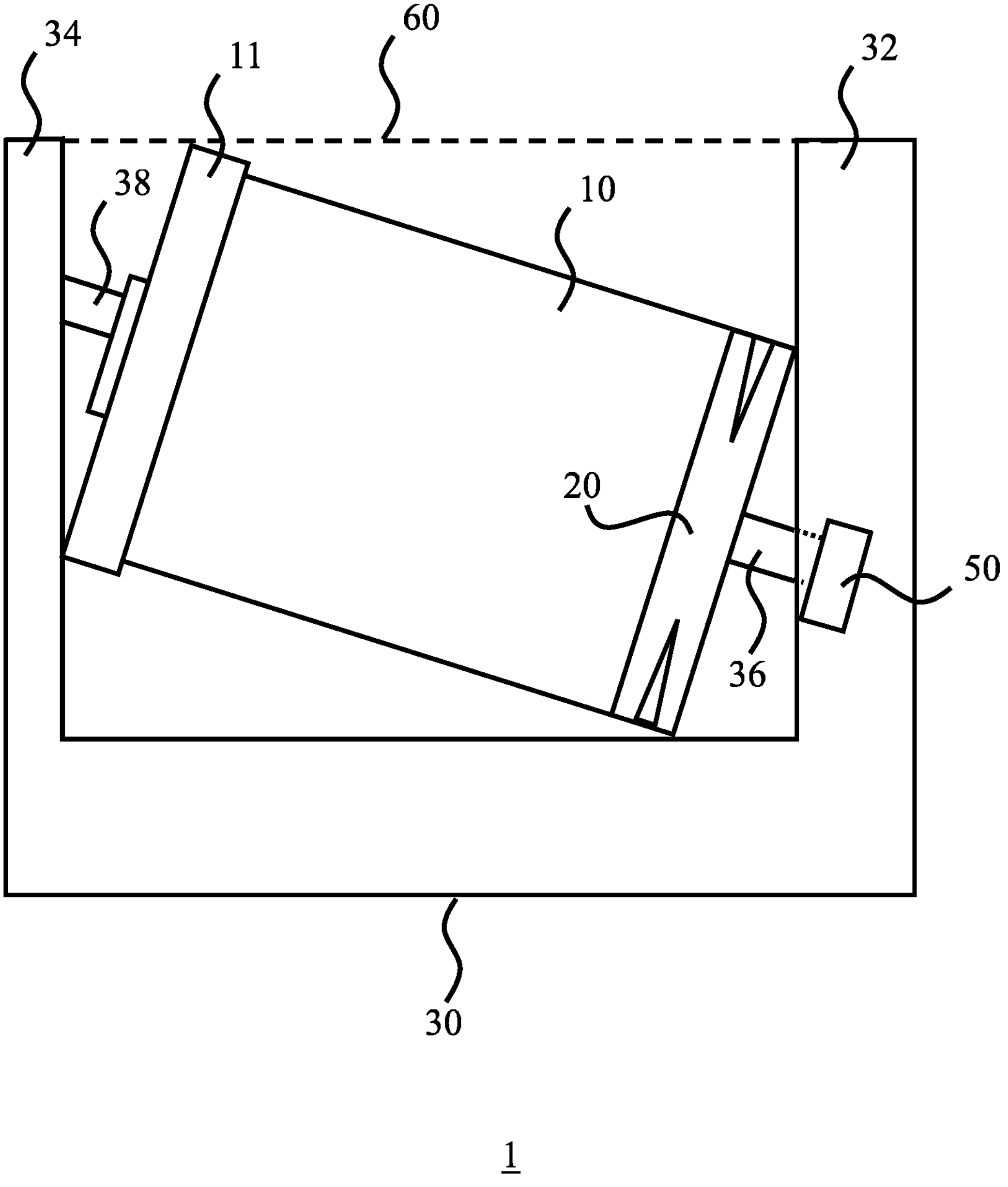
FIG. 14 schematically depicts a cross-sectional view of a detail of a food processing apparatus according to yet another embodiment.

The food processing chamber 10 may be vertically mounted on the base 40, as shown in the foregoing embodiments. However, in an alternative embodiment schematically depicted in FIG. 14, the food processing chamber 10 may be docked in a docking station 30 comprising a base portion 32 and an opposing cap portion 34 in between the food processing chamber 10 is docked. This allows the food processing chamber 10 to be docked in the docking station 30 in a tilted orientation or even in a horizontal orientation, which promotes tumbling of the food product in the food processing chamber 10, which promotes crushing of the food chunks in the food processing chamber 10 and helps to reduce load forces exerted onto the cutting blades 24 by the food chunks, thereby extending the lifespan of the cutting blades 24. In this embodiment, the blade arrangement 20 may be mechanically driven or may be magnetically driven as previously explained.

The food processing chamber 10 may be mounted in any suitable fashion within the docking station 20. For example, a mounting post 36 or the like may extend from the bottom portion 14 of the food processing chamber 10 to the base portion 32 of the docking station 30, where the mounting post 36 may be secured in the base portion 32 of the docking station in any suitable manner. In case the blade arrangement 20 is mechanically driven, the mounting post 36 may form any of the previously described drive mechanisms between the motor 50 and the food processing chamber 10. A further mounting post 38 or the like may extend from the lid 11 of the food processing chamber 10 and be secured in the cap portion 34 of the docking station in any suitable manner. Many other suitable docking mechanisms will be immediately apparent to the skilled person.

The food processing chamber 10 may be stationary in the docking station 30 may be rotatably mounted therein, e.g. in case the food processing chamber 10 is designed to rotate together with the blade arrangement 20 or rotate around a stationary body 22 of the blade arrangement 20 as previously explained. In the latter case, the protective cover 60 may extend between the base portion 32 and the cap portion 34 of the docking station 30 to prevent access to the rotating food processing chamber 10 during operation of the food processing apparatus 1.

In some embodiments, the tilt angle of the food processing chamber 10 within the docking station 30 is fixed. However, in an alternative set of embodiments, the tilt angle of the food processing chamber 30 may be adjustable. To this end, the docking station 30 may comprise an adjustment mechanism that may be user-operated, e.g. prior to operation of the food processing apparatus 1, or may be automatically adjusted during operation of the food processing apparatus 1. For example, the base portion 32 and the cap portion 34 may form part of a bracket on an adjustable pivot (not shown), which pivot is adjusted in order to change the orientation of the bracket on the pivot such as to change the tilt angle of the food processing chamber 10. The pivot may be motorized in order to facilitate automatic adjustment of this tilt angle. Of course, many other implementations of such as adjustable tilt mechanism for the food processing chamber 10 may be contemplated.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A food processing apparatus having a food processing chamber, comprising:
- a blade arrangement;
- a motor arranged to drive the blade arrangement; and
- a securing ring arranged to secure the blade arrangement on a bottom portion of the food processing chamber,
- wherein the blade arrangement excludes a central shaft and comprises a body having a surface arrangement delimiting a cavity, and a plurality of cutting blades extending from said surface arrangement into said cavity,
- wherein the motor comprises a mechanical coupling for coupling to the food processing chamber such as to rotate the food processing chamber including the blade arrangement, and
- wherein the mechanical coupling comprises a central shaft driven by the motor and at least one engagement member coupled to the central shaft arranged to engage with the securing ring or the body.

2. The food processing apparatus of claim 1, wherein the body is a cylindrical body.

3. The food processing apparatus of claim 1, wherein the plurality of cutting blades are offset to each other along a central axis of said body.

4. The food processing apparatus of claim 1, further comprising a protective cover at least partially covering the food processing chamber.

5. The food processing apparatus of claim 1, wherein the blade arrangement further comprises a further body, and the body is rotatably mounted on said further body.

6. The food processing apparatus of claim 1, wherein the motor is mechanically coupled to the body such as to rotate the body within the food processing chamber or is mechanically coupled to the food processing chamber such as to rotate the food processing chamber relative to the body.

7. The food processing apparatus of claim 1, wherein the at least one engagement member is mounted on a further body attached to said central shaft or comprises a plurality of engagement members individually mounted on respective arms that extend from said central shaft in a radial arrangement.

8. The food processing apparatus of claim 1, wherein the motor comprises a stator arranged to create a rotating magnetic field and the body is responsive to said rotating magnetic field.

9. The food processing apparatus of claim 8, wherein the stator is arranged around the body.

10. The food processing apparatus of claim 1, further comprising a docking station for the food processing chamber, wherein said docking station comprises a base including the motor for engaging with a bottom portion of the food processing chamber including the blade arrangement and a holder opposing the base for engaging with a top portion of the food processing chamber.

11. The food processing apparatus of claim 10, wherein the food processing chamber is in a tilted orientation when docked in said docking station, optionally wherein said tilted orientation is adjustable during operation of the food processing apparatus.

12. The food processing apparatus of claim 1, wherein the food processing apparatus is a blender or a smoothie maker.

* * * * *